US 9,471,676 B1

(12) United States Patent
Berent et al.

(10) Patent No.: US 9,471,676 B1
(45) Date of Patent: Oct. 18, 2016

(54) SYSTEM AND METHOD FOR SUGGESTING KEYWORDS BASED ON IMAGE CONTENTS

(71) Applicant: GOOGLE INC., Mountain View, CA (US)

(72) Inventors: Jesse Berent, Kuesnacht (CH); King Hong Thomas Leung, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/650,091

(22) Filed: Oct. 11, 2012

(51) Int. Cl.
*G06F 17/30* (2006.01)

(52) U.S. Cl.
CPC ... *G06F 17/30799* (2013.01); *G06F 17/30852* (2013.01); *G06F 17/30858* (2013.01)

(58) Field of Classification Search
CPC ............ G06T 7/0075; G06K 9/00201; G06F 17/30799; G06F 17/30852; G06F 17/30858
USPC ....... 707/755, 713, 721, 727, 737, 749, 758, 707/767, E17.004, E17.009, E17.019, 707/E17.02, E17.021, E17.022, E17.023, 707/E17.024, E17.028, 913; 382/154; 715/716
See application file for complete search history.

(56) References Cited

U.S. PATENT DOCUMENTS

| | | | | |
|---|---|---|---|---|
| 5,675,752 A * | 10/1997 | Scott et al. | ................... | 715/866 |
| 6,192,151 B1 * | 2/2001 | Miyatake et al. | ............ | 382/190 |
| 7,548,936 B2 * | 6/2009 | Liu | ................... | G06F 17/30274 |
| 8,180,667 B1 * | 5/2012 | Baluja et al. | .............. | 705/14.19 |
| 8,189,963 B2 * | 5/2012 | Li et al. | ......................... | 382/305 |
| 8,209,320 B2 * | 6/2012 | Reitter et al. | ................ | 707/709 |
| 8,234,281 B2 | 7/2012 | Do | | |
| 8,433,566 B2 * | 4/2013 | Cui et al. | ...................... | 704/235 |
| 8,503,523 B2 * | 8/2013 | Williams et al. | ........ | 375/240.08 |
| 9,111,582 B2 * | 8/2015 | Eseanu | ............... | G11B 27/105 |
| 2002/0012521 A1 * | 1/2002 | Nagasaka et al. | ............. | 386/46 |
| 2004/0125124 A1 * | 7/2004 | Kim | .................. | G06F 17/30799 715/716 |
| 2007/0133947 A1 * | 6/2007 | Armitage | .......... | G06F 17/30256 386/224 |
| 2008/0281676 A1 | 11/2008 | Stahura et al. | | |
| 2009/0007202 A1 * | 1/2009 | Williams et al. | ............ | 725/105 |
| 2009/0123090 A1 * | 5/2009 | Li et al. | ....................... | 382/305 |
| 2010/0077003 A1 * | 3/2010 | Kondo et al. | ................. | 707/780 |
| 2011/0064318 A1 * | 3/2011 | Gao et al. | ..................... | 382/224 |
| 2011/0081075 A1 * | 4/2011 | Adcock et al. | .............. | 382/165 |
| 2012/0167144 A1 * | 6/2012 | Avison-Fell | .................... | 725/51 |
| 2015/0161147 A1 * | 6/2015 | Zhao | ................... | G06F 17/3079 707/772 |
| 2015/0169558 A1 * | 6/2015 | Zhao | ................... | G06F 17/3079 707/722 |

* cited by examiner

*Primary Examiner* — Jean M Corrielus
(74) *Attorney, Agent, or Firm* — Fish & Richardson P.C.

(57) ABSTRACT

A computer-implemented method includes receiving a first visual media article from an entity that provides content sources, identifying a first content item of the first visual media article, and identifying in a database a second visual media article that includes a second content item, wherein the second content item is substantially similar to the first content item. The method further includes extracting from logging data one or more keywords that yield a listing of a content source that includes the second visual media article, and suggesting the extracted one or more keywords to the entity.

15 Claims, 4 Drawing Sheets

SYSTEM AND METHOD FOR SUGGESTING KEYWORDS BASED ON IMAGE CONTENTS

BACKGROUND

Unless otherwise indicated herein, the materials described in this section are not prior art to the claims in this application and are not admitted to be prior art by inclusion in this section.

On the Internet, third party contents (such as advertisements) are presented based on a content displayed on a content source (such as a webpage), which typically matches a specific user-requested content. Further, a subject matter of a third party content is usually determined based upon keywords that are submitted with and/or extracted from the textual content of the third party content.

Although third party content providers (such as advertisers) are able to reach a large audience, their new visual media contents or articles (such as image ads) are not always relevant to end-users, because they may have not been properly matched with suitable content sources.

SUMMARY

Disclosed herein are improved a method and system for suggesting keywords to third party content providers based on image contents.

In one aspect, an embodiment of a computer-implemented method includes receiving a first visual media article from an entity that provides content sources, identifying a first content item of the first visual media article, and identifying in a database a second visual media article that includes a second content item, wherein the second content item is substantially similar to the first content item. The method further includes extracting from logging data one or more keywords that yield a listing of a content source that includes the second visual media article, and suggesting the extracted one or more keywords to the entity.

In another aspect, the first content item is representative of an image pattern of the first visual media article.

In another aspect, the first content item represents a subject matter of the first visual media article.

In another aspect, the first content item is identified by an image recognition application.

In another aspect, the first content item comprises an image pattern that is substantially similar to that of the second content item.

In another aspect, a computer readable storage medium having stored therein instructions executable by a computing device to cause the computing device to perform the above-introduced method for suggesting keywords to third party content providers based on image contents.

These as well as other aspects, advantages, and alternatives will become apparent to those of ordinary skill in the art by reading the following detailed description, with reference where appropriate to the accompanying drawings. Further, it should be understood that the disclosure provided in this summary section and elsewhere in this document is intended to discuss the embodiments by way of example only and not by way of limitation.

DETAILED DESCRIPTION

Figure 1:
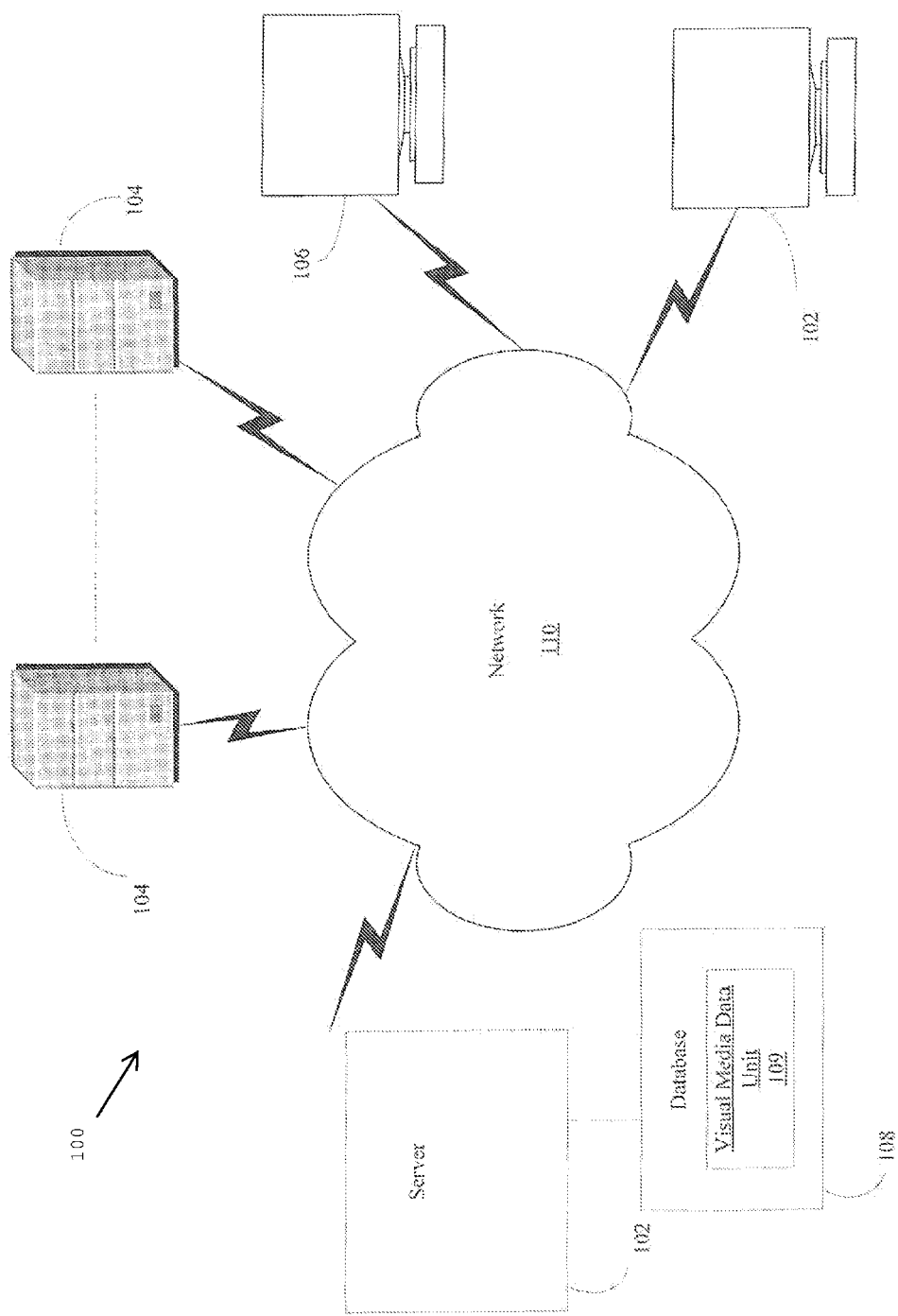
FIG. 1 is a schematic diagram illustrating an embodiment of a computer networked system for suggesting keywords to third party content providers based on image contents.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Overview

In a computing system that is configured to select third party contents (such as ads) for presentation to Internet users, one key for effective selections is coming up with appropriate keywords. More effective third party contents translate into more selections of the third party contents and thus more leads for the third party content providers to turn those prospects into customers. Further, a third party content provider may associate one or more keywords with a content so that when a user requests a content source or page (such as a web page) associated with the same or similar keywords, the third party content may be provided with the requested content source. As such, third party contents are provided to users who are more likely to be interested in them.

Conventionally, a third party content is associated with a visual media article or item (i.e., image or video) by matching the subject matter of the third party content with the subject matter of the visual media article at the same level of specificity. A visual media article is a media article that communicates its content through a display that may be viewed. As stated above, third party contents are associated with keywords that may be used to define a very specific subject matter. However, a new graphical or visual media article typically has no associated keywords, which does not lend itself to an appropriate matching with third party contents.

Embodiments of the present disclosure relate to matching visual media articles with keywords that can yield high click through rates (CTRs). In one exemplary embodiment, a computing system analyzes the content of a visual media article and seeks similar visual media articles that have been presented in third party contents to users and yielded high CTRs. The effective keywords of the similar visual media articles are then suggested to third party content providers for selection. Image content analysis may include message digest (MD) fingerprinting, clustering, content feature similarity, or higher-level optical character recognition (OCR)/product similarity, keyword classifiers, and the like. In another embodiment, image recognition technologies may be utilized to determine a subject matter of the visual media article, and keywords of visual media articles that are substantially associated with the determined subject matter and yielded high CTRs are suggested to third party content providers for selection.

Now referring to FIG. 1, a schematic diagram illustrates an embodiment of a computer networked system 100 for suggesting keywords to third party content providers based on contents or features of visual media articles. Computer networked system 100 includes a server 102, one or more third party content providers 104 (hereafter referred to as providers), one or more end users 106, and one or more databases 108 operatively connected to server 102. Database 108 includes a visual media data unit 109 (hereafter referred to as data unit). Computer networked system 100 may enable server 102 to process contents (such as images and videos) and requests received from providers 104 and end users 106. It will be understood and appreciated by those of ordinary skill in the art that computer networked system 100 is merely an example of one suitable computing system and is not intended to suggest any limitation as to the scope of the use or functionality of the present disclosure.

Providers 104 and end users 106 may communicate with one or more servers 102 via electronic communication, including Internet communications facilitated by communications network 110. Information, which may be communicated between and among server 102, providers 104, and end users 106, may include one or more of the following: image information, provider information, image similarity information, and other information. The image information may include one or more of the following: visual content (e.g., pictures, graphics, and text), any language(s) used in the image, and information about the image's intended audience (such as geographic area, age range, gender, race, national origin, religion, other demographic information).

Figure 2:
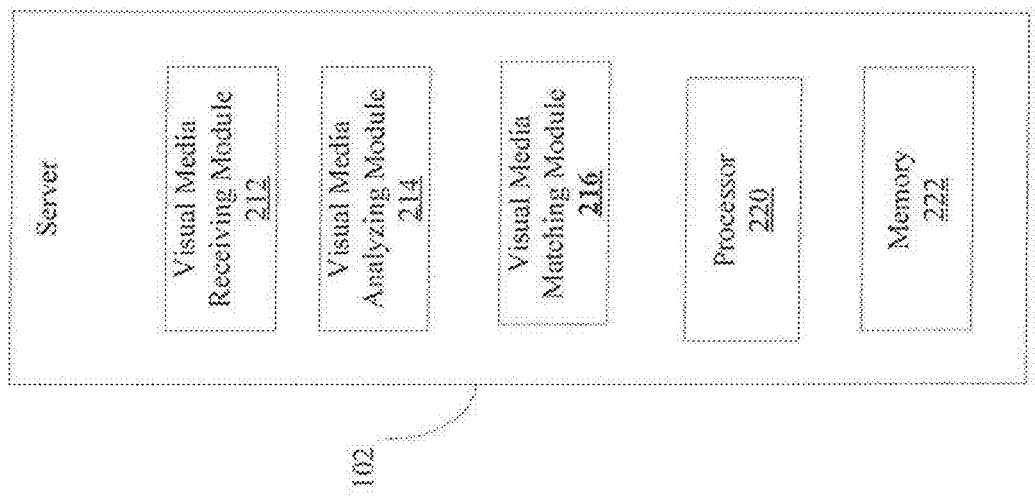
FIG. 2 is a block diagram illustrating a variety of modules configured to analyze visual media articles and determining keywords for suggestion to third party content providers.

As shown in FIG. 2, server 102 includes a visual media receiving module 212 (hereafter referred to as receiving module), a visual media analyzing module 214 (hereafter referred to as analyzing module), and a visual media matching module 216 (hereafter referred to as matching module). In some embodiments, one or more of modules 212-216 may be implemented as stand-alone applications or programs. Server 102 further includes a processor unit 220, and a memory unit 222, both of which will be discussed in detail hereafter. In FIG. 2, server 102 is illustrated as a single computing device. Alternatively, server 102 may be a distributed computing environment that includes multiple computing devices coupled with one another via one or more networks. Such networks may include, without limitation, one or more local area networks (LANs) and/or one or more wide area networks (WANs). Such network environments are typically found in offices, enterprise/wide computer networks, intranets, and the Internet. Moreover, it will be understood by those of ordinary skill in the art that server modules 212-216 are exemplary in nature and in number and should not be construed as limiting. Any number of modules may be employed to achieve the desired functionality within the scope of embodiments of the present disclosure. In addition, each module may reside on more than one computing devices within computer networked system 100.

Input data to server 102 may be implemented in a variety of ways. In one embodiment, input data is provided to server 102 through network 110, which includes the Internet. In another embodiment, input data is provided to server 102 through a removable memory, such as a CD, Floppy disk, or Flash drive. In yet another embodiment, input data may be entered using a keyboard that is communicatively coupled to server 102. A user interface may be provided to facilitate the transfer or provision of input data to server 102 from anyone of providers 104 and end users 106. Input data may be provided from one program to a component within server 102. In that instance, the program could be within server 102 or on a separate computing device (not shown) that is communicatively coupled to server 102. Input data may include an image, a video, or any other visual media article.

Receiving module 212 is configured for receiving visual media articles. As stated above, visual media articles may be in the form of images, video or a combination thereof. In one embodiment, receiving module 212 receives one or more images and/or videos. When a video is received, receiving module 212 may perform a key frame extraction process that finds at least one key frame that is representative of the video subject matter. The key frame extractions are performed as a preparatory step for analyzing module 214 that analyzes the key frame rather than every frame in the video. In an alternate embodiment, another preparatory step may also be performed by receiving module 212 as needed.

Analyzing module 214 may process the visual media article through feature identifying algorithms, which may include object recognition, shape extraction, space partitioning, and color identification algorithms. These feature identifications may be performed by message digest (MD) fingerprinting, feature clustering, and optical character recognition (OCR) processes. As known to one of ordinary skill in the art, an MD process is an algorithm that is used to verify data integrity through the creation of a 128-bit message digest from the visual media article. According to the standard, it is "computationally infeasible" that any two different visual media articles that have been input to the MD algorithm could have as the output the same message digest. As known to one of ordinary skill in the art, there are three kinds of MD processes, MD2, MD4 and MD5.

Regarding feature clustering, local features of a visual media article are typically extracted from images and grouped into appearance clusters. Besides reducing the size of a feature space, appearance clusters can allow to capture a larger variability of a local structure than individual features, as well as to focus on parts which re-occur. A typical feature detector may extract between tens and hundreds of features per image. Additionally, analyzing module 214 may analyze the received visual media articles by breaking them down into various descriptors. Descriptors may include sharp edges, soft edges, colors, large blocks of colors, and other such identifying features associated with the visual media articles. As known to one of ordinary skill in the art, an OCR process or system is configured to recognize printed characters. OCR systems can recognize many different OCR fonts, as well as typewriter and computer-printed characters. Advanced OCR systems can recognize hand printing. When a text document is scanned into a computing device, it is turned into a bitmap, which is a picture of the text. OCR software analyzes the light and dark areas of the bitmap in order to identify each alphabetic letter and numeric digit. When it recognizes a character, it converts it into American Standard Code for information interchange (ASCII) text.

Matching module 216 is configured to receive the results of the analysis performed by analyzing module 214 on the received visual image article, and to compare the identified features against those of visual media articles stored in data unit 109. Data unit 109 may store a plurality of visual media articles as well as information about their corresponding features, and the comparison of the received visual media article against the stored ones by matching module 216 can serve to identify those ones that have substantially or sufficiently similar features as those ones identified for the received visual media article.

In one embodiment, data unit 109 is configured to store visual media articles along with associated keywords that are used when matching these visual media articles with content sources (e.g. web pages), which are triggered for presentation to end users 106 when the associated keywords are extracted from search queries submitted by end users 106. Data unit 109 is further configured to store keywords and relating CTRs. As such, data unit 109 is configured to store visual media article along with their respective keywords that yielded high CTRs.

Moreover, all input data, such as visual media articles, keywords, CTRs, and output data (such as third party contents), as well as intermediary data, may be stored temporarily or permanently in data unit 109. It will be understood and appreciated by those of ordinary skill in the art that the information stored in data unit 109 may be configurable and may include any information relevant to the third party contents, visual media articles, keywords, and CTRs. The content and volume of such information are not intended to limit the scope of embodiments of the present disclosure. Further, though illustrated as a single component, data unit 109 may be a plurality of databases, which may reside on a plurality of computing devices.

Alternatively, in one embodiment, server 102 may also store in memory 122 a wide variety of visual media articles and data used by other image processors to process and identify contents of the visual media articles. For instance, memory 122 may store programs and files that define and describe various visual media articles. The programs may also identify patterns in the visual media articles that can be used to compare the received visual media article to other visual media articles.

Figure 3:
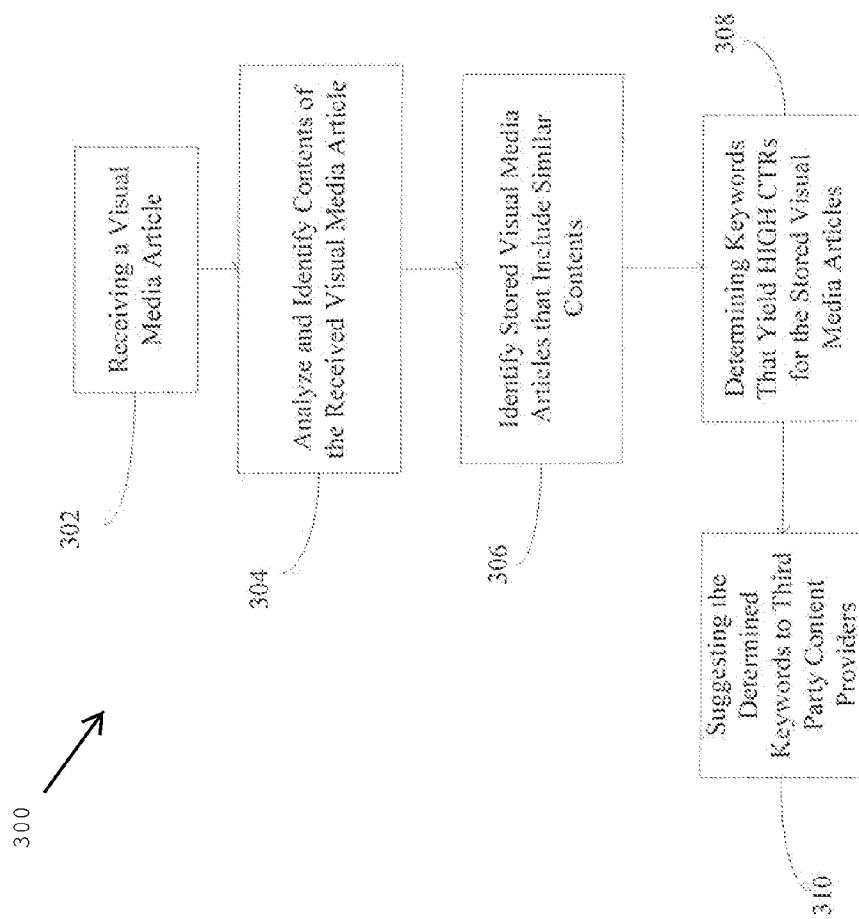
FIG. 3 is a flow chart illustrating an example embodiment of a method for suggesting keywords to third party content providers based on image contents.

Now referring next to FIG. 3, a flow diagram shows an exemplary method 300 for suggesting keywords to third party content providers based on contents or features of visual media articles. At step 302, receiving module 212 of server 102 receives a visual media article from one of providers 104. As stated above, visual media articles may generally be divided into two categories: images and videos. Images contain visual representations that do not change or move when viewed. The image may be in a file type that is capable of display by a web browser. Examples of such file types, include, but are not limited to, a GIF, JPEG, TIF or SVG file formats. A video contains visual representations that change and/or move when viewed. The video may be in a file type that is capable of display by a web browser, one example of which is the MPEG format.

At step 304, the visual media article is provided to analyzing module 214 in order to analyze and identify its content or features by using automated content recognition programs, such as the ones discussed above, namely MD5 fingerprinting, clustering, and the like. At step 306, the identified contents of the visual media article are provided to matching module 216, which then analyzes other visual media articles that are stored in data unit 109 in order to identify the ones that include contents that are substantially similar to those of the received visual media article. Once matching module 216 has identified the stored visual media articles that include the substantially similar contents, matching module 216 checks any available log data that includes keywords that yielded a desirable CTR for third party contents that included the stored visual media articles. The log data is configured to include for any third party content data that relates CTR and keywords that trigger the third party content. As such, the log data provides information that tells for any particular stored visual media article which keywords may yield a high CTR.

At step 308, matching module 216 determines the keywords that can yield a high CTR for the received visual media article and the determined keywords are provided to the provider 104 that provided the received visual media article, at step 310. Subsequently, provider 104 can associate the received visual media article with third party contents and content sources that are triggered by the suggested keywords.

Figure 4:
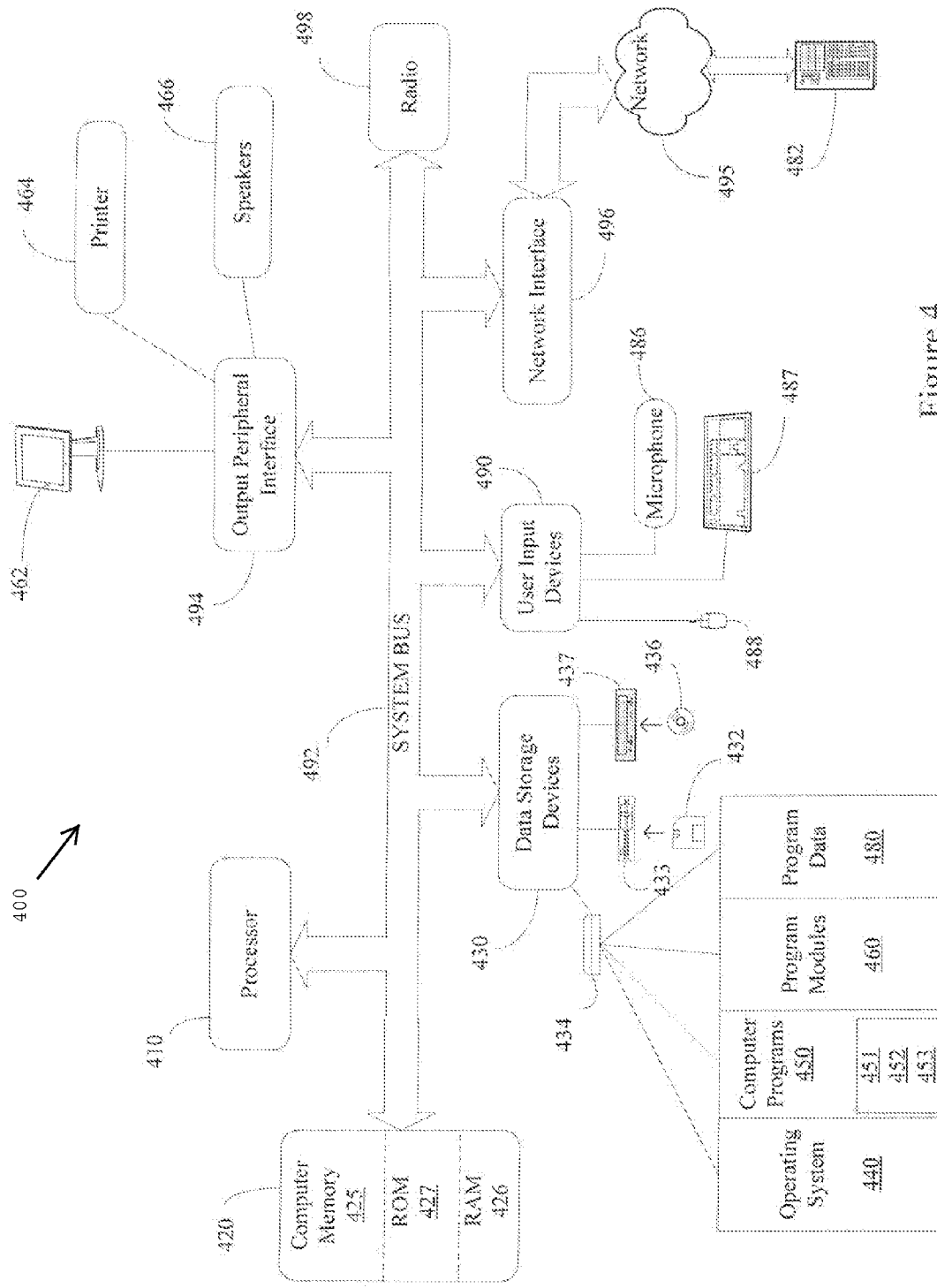
FIG. 4 is a schematic drawing illustrating a computing network system according to an exemplary embodiment.

With reference to FIG. 4, depicted is an exemplary computing system for implementing the above-discussed embodiments. FIG. 4 includes computer 400 running a computer program 450. Computer 400 is a programmable machine designed to sequentially and automatically carry out a sequence of arithmetic or logical operations.

In order to carry out these operations, computer 400 includes a processor 410 in communication with a computer readable storage medium 420. Computer readable storage medium 420 is any medium which can be used to store information which can later be accessed by processor 410. Computer readable storage medium 420 includes computer memory 425 and data storage devices 430. Computer memory 425 is preferably a fast-access memory and is used to run program instructions executable by the processor 410. Computer memory 425 includes random access memory (RAM) 426, flash memory, and read only memory (ROM) 427.

Data storage devices 430 and their associated computer readable memory medium provide storage of computer readable instructions, data structures, program modules and other data for the computer 400. Data storage devices 430 include magnetic medium like a floppy disk 432 which are read by a floppy disk drive 433, a hard disk drive 434, and magnetic tape; optical medium 436 like a Compact Disc (CD), a Digital Video Disk (DVD), and a Blu-ray Disc which are read by an optical disk drive 437; and solid state memory such as random access memory (RAM), flash memory, and read only memory (ROM).

Data storage devices 430 are preferably physical devices and are used to store any information or program which may be accessed by processor 410, such as an operating system 440, a computer program 450, a program module 460 which may run as a part of computer program 450, and program data 480. Any computer program 450 may be a standalone application or a program module 460 which runs as part of a computer program 450.

Computer program 450 may include specific types of computer programs or applications 451, 452, and 453 such as a visual media receiving module, a visual media analyzing module, and a visual media matching module. Computer 400 further includes input devices 490 through which data may enter the computer 400, either automatically or by a user who enters commands and data. Input devices 490 can include: an electronic digitizer or drawing board; a barcode reader, an RFID reader, a debit card reader, or any near-field communication (NFC) reader; a microphone 486; an image capture device such as a camera, a video camera, or a digital flatbed or sheet-fed scanner; a keyboard 487, a numeric pin pad, any device which has a series of depressible keys; a pointing device 488, such as a mouse, a trackball or a touch pad; any USB device, any Bluetooth™ enabled device, or any networked device able to generate and transmit a signal. Other input devices 490 may include a joystick, game pad, satellite dish, an instrument, a sensor, and the like. In one or more embodiments, input devices 490 are any devices that can direct display or instantiation of computer programs 450 running on processor 410 and computer 400.

These and other input devices 490 can be connected to processor 410 through a user input interface that is coupled to a system bus 492, but may be connected by other interface and bus structures, such as a parallel port, game port or a universal serial bus (USB). Computer 400 may also include other peripheral output devices such as speakers 466, printers 464, and/or display devices 462, which may be connected to the processor 410 through an output peripheral interface 494 that is coupled to the system bus 492, but may be connected by other interface and bus structures, such as a parallel port, game port or a universal serial bus (USB).

Computer 400 may include a radio 498 or other type of communications device for wirelessly transmitting and receiving data for the computer 400 with the aid of an antenna. Radio 498 may wirelessly transmit and receive data using WiMAX™, 802.11 a/b/g/n, Bluetooth™, 2 G, 2.5 G, 3 G, and 4 G, wireless standards. Radio 498 may be connected to the processor 410 through an interface that is coupled to a system bus 492, but may be connected by other interface and bus structures, such as a parallel port, game port or a universal serial bus (USB).

Computer 400 may include a network interface device 496 for connecting the computer 400 to a network 495. The network interface device 496 uses a common protocol allowing computer 400 to communicate with other remote computers 482 which are all connected to the network 495. Network interface device 496 includes a network adapter, such as a wireless network adapter or a wired network adapter; a modem; or any device which can interface with a network 495. Network interface device 496 may be connected to the processor 410 through a network interface that is coupled to a system bus 492, but may be connected by other interface and bus structures, such as a parallel port, game port or a universal serial bus (USB).

Network 495 allows computer 400 to operate in a networked environment having logical connections between computer 400 and one or more remote computers 482. The remote computer 482 may be a personal computer, a server, a router, a network PC, a peer device or other common network node, and may include many if not all of the elements described above relative to computer 400. Networking environments are commonplace in offices, enterprise-wide computer networks, intranets and the Internet. For example, in the subject matter discussed herein, computer 400 may comprise the source machine from which data is being migrated, and remote computer 482 may comprise the destination machine. Note, however, that source and destination machines need not be connected by network 495 or any other means, but instead, data may be migrated via any media capable of being written by the source platform and read by the destination platform or platforms. When using a Local Area Network (LAN) or a Wireless Local Area Network (WLAN), network 495 connects computer 400 with remote computer 482 via a network adapter. When used in a Wide Area Network (WAN), computer 400 may include a modem or other means for establishing communications over the WAN, such as radio 498, to another remote computer 482. It will be appreciated that other means of establishing a communications link between computer 400 and other remote computers 482 may be used.

In one embodiment, computer 400 is in communication with remote computer 482, and portions of computer program 450 are run on remote computer 482 and/or computer 400. In this embodiment, computer program 450 receives commands and information from the computer 400 being input via user input device 490. Information received from computer 400 may then be relayed to remote computer 482. Additionally information generated by computer program 450 running on remote computer 482 and/or computer 400 may be displayed on display 462 connected with computer 400.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims, along with the full scope of equivalents to which such claims are entitled. It is also to be understood that the terminology used herein is for the purpose of describing particular embodiments only, and is not intended to be limiting.

What is claimed is:

1. A computer-implemented method, comprising:
   receiving, by one or more computing devices, a video;
   identifying, by the one or more computing devices, a key frame that is representative of subject matter depicted by the video;
   identifying, by the one or more computing devices and in a database, a stored image that has at least a specified level of visual similarity to the key frame based on visual features of the key frame and the stored image;
   determining, by the one or more computing devices and based on logging data corresponding to presentations of the identified stored image, that a keyword that triggers display of the identified stored image with various web pages provides at least a specified click through measure for the identified stored image when display of the identified stored image is triggered by the keyword; and
   outputting, over a communications network, based on the determination, and based on the visual similarity between the key frame and the identified stored image, data that suggest the keyword as a keyword that triggers display of the video.

2. The computer-implemented method of claim 1, wherein the key frame is representative of an image pattern of the video.

3. The computer-implemented method of claim 1, wherein the key frame is identified by an image recognition application.

4. The computer-implemented method of claim 1, wherein the keyword comprises an effective keyword that yields a click through rate (CTRs) that exceed a threshold.

5. The computer-implemented method of claim 1, wherein logging data is obtained from a web managing entity.

6. The computer-implemented method of claim 1, wherein the video comprises an image pattern matching that of the stored image.

7. A non-transitory computer readable storage medium having stored therein instructions executable by a computing device to cause the computing device to perform functions, the functions comprising:
   receiving a video;
   identifying a key frame that is representative of subject matter depicted by the video;
   identifying in a database a stored image that has at least a specified level of visual similarity to the key frame based on visual features of the key frame and the stored image;
   determining, based on logging data corresponding to presentations of the identified stored image, that a keyword that triggers display of the identified stored image with various web pages provides at least a specified click through measure for the identified stored image when display of the identified stored image is triggered by the keyword; and outputting, over a communications network, based on the determination, and based on the visual similarity between the key frame and the identified stored image, data that suggest the keyword as a keyword that triggers display of the video.

8. The computer readable storage medium of claim 7, wherein the key frame represents an image pattern of the video.

9. The computer readable storage medium of claim 7, wherein the key frame is identified by an image recognition application.

10. The computer readable storage medium of claim 7, wherein the keyword comprises an effective keyword that yields a click through rate (CTRs) that exceed a threshold.

11. The computer readable storage medium of claim 7, wherein
logging data is obtained from a web managing entity.

12. The computer readable storage medium of claim 7, wherein the video comprises an image pattern matching that of the stored image.

13. A computer system, comprising:
a data store storing one or more stored advertisements;
one or more computing devices including at least one processor that interacts with the data store and executes instructions that cause the at least one processor to perform operations comprising:
receiving a video;
identifying a key frame that is representative of subject matter depicted by the video;
identifying in a database a stored image that has at least a specified level of visual similarity to the key frame based on visual features of the key frame and the stored image;
determining, based on logging data corresponding to presentations of the identified stored image, that a keyword that triggers display of the identified stored image with various web pages provides at least a specified click through measure for the identified stored image when display of the identified stored image is triggered by the keyword; and
outputting, over a communications network, based on the determination, and based on the visual similarity between the key frame and the identified stored image, data that suggest the keyword as a keyword that triggers display of the video.

14. The computer system of claim 13, wherein the key frame represents an image pattern of the video.

15. The computer system of claim 13, wherein the key frame is identified by an image recognition application.

\* \* \* \* \*